UNITED STATES PATENT OFFICE.

OTIS HUTCHINS, OF NIAGARA FALLS, NEW YORK, ASSIGNOR TO THE CARBORUNDUM COMPANY, OF NIAGARA FALLS, NEW YORK, A CORPORATION OF PENNSYLVANIA.

PROCESS OF TREATING DIASPORE.

1,326,595.  Specification of Letters Patent.  Patented Dec. 30, 1919.

No Drawing.  Application filed June 28, 1919.  Serial No. 307,268.

*To all whom it may concern:*

Be it known that I, OTIS HUTCHINS, a citizen of the United States, residing at Niagara Falls, in the county of Niagara and State of New York, have invented a new and useful Improvement in Processes of Treating Diaspore, of which the following is a full, clear, and exact description.

This invention relates to an electric furnace treatment of crude diaspore to increase its purity and abrasive properties.

The principal object of the present invention is to purify diaspore as it occurs in natural state, and render the same more useful commercially as an abrasive.

A further object of this invention is to increase the size, hardness and sharpness of diaspore crystals by fusing them in an electric furnace to increase the abrasive properties thereof.

Diaspore is a hydrate of aluminum, and in the pure state has a composition corresponding to the chemical formula $Al_2O_3 \cdot H_2O$ containing 85% alumina and 15% water. This compound occurs in the form of small prismatic crystals having a specific gravity of 3.3–3.5 and a hardness of 6.5–7.0 Mohrs scale. The crystals are gray to yellowish in color, have a concoidal fracture and are very brittle.

Diaspore as it occurs in nature in conjunction with corundum, emery or clay is usually associated with certain impurities in the form of titanium oxid, iron oxid and silica. A typical analysis of this material as it comes from the mine is as follows:

| | |
|---|---|
| $H_2O$ | 14.46% |
| $SiO_2$ | 5.19 |
| $Fe_2O_3$ | 1.27 |
| $TiO_2$ | 2.68 |
| $Al_2O_3$ | 76.50 |
| CaO | .18 |
| MgO | .27 |
| | 100.55 |

I have discovered that the somewhat limited abrasive power of this material due to the small size and brittleness of the crystals can be very greatly increased by subjecting the crude diaspore to an electric furnace fusion in the presence of a reducing agent such as carbon. By this means it is possible to largely reduce the impurities, titanium oxid, iron oxid and silica to their corresponding metals which form a metallic alloy, thus making it possible to obtain a separation of these impurities from the alumina. The molten alumina resulting from this fusion may then be allowed to cool under conditions which make possible the formation of large and tough abrasive crystals having high abrasive properties.

In the preferred method of practising my invention, I crush crude diaspore to one half inch and finer and pass the material through a rotary kiln in order to drive off the bulk of the combined water. A typical analysis of this calcined material is as follows:

| | |
|---|---|
| $H_2O$ | .18 |
| $SiO_2$ | 5.46 |
| $Fe_2O_3$ | .65 |
| $TiO_2$ | 4.32 |
| $Al_2O_3$ | 89.11 |
| | 99.72 |

This calcined material is mixed with coke in the proportion of 1390 lbs. of calcined diaspore to 115 lbs. of coke, or other reducing agent. This mixture is fused in an electric furnace of the type, for example, described in my patent application Serial No. 262,949, filed November 18, 1918, the procedure being substantially the same as that usually employed in the manufacture of aluminous abrasives, and is well understood by those versed in the art.

The resulting product is a dense crystalline mass, gray to pinkish gray in color, having a concoidal fracture. Abrasive grains from this product show considerable toughness and great hardness and sharpness. The analysis of this product is as follows:

| | |
|---|---|
| $Al_2O_3$ | 98.65 |
| FeO | .09 |
| $TiO_2$ | .71 |
| $SiO_2$ | .28 |
| | 99.73 |

While I have described the use and production of materials of a certain composition in my purification process, I do not wish to limit myself to these particular materials, as crude diaspore is known to vary considerably in chemical composition due to the varying amounts of impurities with which it is associated. I may if I choose use varying amounts of carbon in the fusion mixture thus producing a product having a greater or less content of alumina.

Having thus described my invention, I claim:

1. The method of increasing the alumina content of crude diaspore for rendering the same more suitable for use as an abrasive which consists in crushing the same, driving off the bulk of the combined water, mixing the same with a reducing agent, fusing in an electric furnace and then separating the reduced impurities therefrom, substantially as described.

2. The method of increasing the alumina content of crude diaspore for rendering the same more suitable for use as an abrasive, which consists in reducing diaspore to powdered form, driving off the major portion of the combined water therein, mixing the same with a reducing agent, and fusing in an electric furnace, substantially as described.

In testimony whereof I have hereunto set my hand.

OTIS HUTCHINS.